United States Patent
Ishikawa et al.

(10) Patent No.: US 7,328,326 B2
(45) Date of Patent: *Feb. 5, 2008

(54) STORAGE DEVICE

(75) Inventors: Atsushi Ishikawa, Odawara (JP); Koji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 507 days.

This patent is subject to a terminal disclaimer.

(21) Appl. No.: 10/972,794

(22) Filed: Oct. 26, 2004

(65) Prior Publication Data

US 2006/0031648 A1   Feb. 9, 2006

(30) Foreign Application Priority Data

Aug. 9, 2004   (JP) .............. 2004-232585

(51) Int. Cl.
    *G06F 12/16*   (2006.01)
(52) U.S. Cl. ............. 711/203; 711/113; 711/114; 711/161; 711/162
(58) Field of Classification Search ........... 711/113, 711/114, 147, 148, 156, 161, 162, 202, 203; 710/15, 18, 19; 714/1, 6, 47
    See application file for complete search history.

(56) References Cited

U.S. PATENT DOCUMENTS

| | | | |
|---|---|---|---|
| 6,457,139 B1 * | 9/2002 | D'Errico et al. ............... | 714/5 |
| 6,671,774 B1 * | 12/2003 | Lam et al. ................... | 711/112 |
| 6,711,649 B1 * | 3/2004 | Bachmat et al. ............ | 711/114 |
| 7,047,360 B2 * | 5/2006 | Soejima et al. ............. | 711/114 |
| 2001/0023463 A1 * | 9/2001 | Yamamoto et al. ............ | 710/6 |
| 2003/0061362 A1 * | 3/2003 | Qiu et al. ................... | 709/229 |
| 2003/0204597 A1 * | 10/2003 | Arakawa et al. ............ | 709/226 |

FOREIGN PATENT DOCUMENTS

| | | |
|---|---|---|
| JP | 09-069031 | 8/1995 |
| JP | 2000-242439 | 2/1999 |

* cited by examiner

*Primary Examiner*—Sanjiv Shah
*Assistant Examiner*—Daniel Kim
(74) *Attorney, Agent, or Firm*—Reed Smith LLP; Stanley P. Fisher, Esq.; Juan Carlos A. Marquez, Esq.

(57) ABSTRACT

A storage device can flexibly apply a dynamic load distribution and a performance expansion to an unexpected peak performance demand changing in a time sequence such as a web server and a contents delivery at the minimum cost. In the storage device, a load condition of a logical volume is measured by a performance measuring mechanism based on a data and command processing amounts transferred by a data transfer mechanism, and contents of the logical volume set in the physical volume are copied to a logical volume set in the auxiliary logical volume by a copy mechanism based on a measurement result of the performance measuring mechanism, and the logical volume set in the auxiliary physical volume copied by the copy mechanism and the logical volume set in the physical volume serving as a copy source are provided as one virtual logical volume in a host, thereby distributing a load from the host.

5 Claims, 12 Drawing Sheets

FIG. 3

| VIRTUAL LU NUMBER | NUMBER OF MAPPED LUs | ACTUAL LU NUMBER | | | | | |
|---|---|---|---|---|---|---|---|
| LU0 | 1 | LU0 | Null | Null | Null | ..... | Null |
| LU1 | 1 | LU1 | Null | Null | Null | ..... | Null |
| LU2 | 3 | LU2 | LU3 | LU4 | Null | ..... | Null |
| ⋮ | ⋮ | ⋮ | ⋮ | ⋮ | ⋮ | | ⋮ |
| LU n | 0 | Null | Null | Null | Null | ..... | Null |

FIG. 4

| ACTUAL LU NUMBER | NUMBER OF COMMANDs PROCESSED PER UNIT TIME | PROCESSING DATA AMOUNT PER UNIT TIME |
|---|---|---|
| LU0 | NUMBER OF COMMANDs PROCESSED PER UNIT TIME | PROCESSING DATA AMOUNT PER UNIT TIME |
| LU1 | NUMBER OF COMMANDs PROCESSED PER UNIT TIME | PROCESSING DATA AMOUNT PER UNIT TIME |
| ⋮ | ⋮ | |
| LU n | NUMBER OF COMMANDs PROCESSED PER UNIT TIME | PROCESSING DATA AMOUNT PER UNIT TIME |

FIG. 5

| AUXILIARY-REGION-USING ACTUAL LU NUMBER | COPY-SOURCE ACTUAL LU NUMBER |
|---|---|
| LU3 | LU2 |
| LU4 | LU2 |
| ⋮ | ⋮ |
| Null | Null |

STORAGE DEVICE

CROSS-REFERENCE TO RELATED APPLICATION

The present application claims priority from Japanese patent application No. JP 2004-232585 filed on Aug. 9, 2004, the content of which is hereby incorporated by reference into this application.

BACKGROUND OF THE INVENTION

The present invention relates to a storage device and particularly to a technique effectively applied to a load distribution with respect to a logical volume.

In recent years, in the current of a storage consolidation by a web server, and a content delivery, etc. a storage device is shared by a plurality of applications and contents, and there is increased a system in which a load condition of the storage device with respect to a logical volume cannot be expected by the respective applications.

Accordingly, in order to expand performance of the storage device with respect to a load of the logical volume, there have conventionally been a structure in which the same logical volume of data is divided into and relocated at a plurality of magnetic dick drive groups (see, for example, Japanese Patent Laid-open No. 9-69031), and a structure in which the divided data is further divided into and relocated at array groups defined by a sub system (see, for example, Japanese Patent Laid-open No. 2000-242439).

SUMMARY OF THE INVENTION

However, in the conventional storage device, the performance of the logical volume can be expanded only at an initial setting time of defining the logical volume, and on-demand performance cannot be expanded. Further, in view of access performance to a certain small range, it is impossible to expand the performance of disks more in number than the disks constituting the above-mentioned logical volume.

Therefore, an object of the present invention is to provide a storage device which can flexibly apply a dynamic load distribution and/or a performance expansion at the minimum cost to an unexpanded peak performance demand changing into a time sequence such as a web server and a content delivery.

Outlines of representative ones of inventions disclosed by the present application will be briefly described as follows.

A storage device according to the present invention comprises:
a storage control unit; and
a storage unit,
wherein said storage control unit includes:
a host I/F control section executing communication with an upper apparatus;
a disk I/F control section executing communication with said storage unit;
a data transfer mechanism executing a data transfer processing between said host and said storage unit;
a cache memory temporarily storage data to be transferred between said host and said storage unit;
a performance measuring mechanism; and
a copy mechanism,
said storage unit includes:
a physical volume and an auxiliary physical volume that are physical memory regions provided by a plurality of physical disk drives for storing data; and
a plurality of logical volumes that are logical memory regions to be set in each of said physical volume and said auxiliary physical volume,
wherein a load condition of said logical volume is measured by said performance measuring mechanism based on a data amount and a command processing amount to be transferred by said data transfer mechanism,
a content of the logical volume set in said physical volume is copied to the logical volume set in said auxiliary physical volume by said copy mechanism based on a measurement result of said performance measuring mechanism, and
the logical volume set in said auxiliary physical volume copied by said copy mechanism and the logical volume set in said physical volume serving as a copy source are provided as one virtual logical volume to said upper apparatus, thereby distributing a load form said upper apparatus.

Further, a storage device according to the present invention comprises:
a storage control unit; and
a storage unit,
wherein said storage control unit includes:
a host I/F control section executing communication with an upper apparatus;
a disk I/F control section executing communication with said storage unit;
a data transfer mechanism executing a data transfer processing between said host and said storage unit;
a cache memory temporarily storing data to be transferred between said host and said storage unit;
a performance measuring mechanism; and
a copy mechanism,
said storage unit includes:
a physical volume and an auxiliary physical volume that are physical memory regions provided by a plurality of physical disk drives for storing data; and
a plurality of logical volumes that are logical memory regions to be set in each of said physical volume and said auxiliary physical volumes,
wherein a load condition of the logical volume set in said physical volume is measured by said performance measuring mechanism based on a data amount and a command processing amount to be transferred by said data transfer mechanism,
data accessed from said upper apparatus out of contents of the logical volume set in said physical volume is copied to the logical volume set in said auxiliary physical volume by said copy mechanism based on a measurement result of said performance is controlled as difference control information, and
the logical volume set in said physical volume and the logical set in said auxiliary physical volume copied by said copy mechanism are provided as one virtual logical volume to said upper apparatus, thereby distributing a load from said upper apparatus based on said difference control information.

BRIEF DESCRIPTION OF THE DRAWINGS

FIG. 3 is a view showing a virtual-LU-and-actual-LU mapping table in a control table of a storage device according to a first embodiment of the present invention.

FIG. 4 is a view showing a performance monitoring table in a control table of a storage device according to a first embodiment of the present invention.

FIG. 5 is a view showing an auxiliary physical volume management table in a control table of a storage device according to a first embodiment of the present invention.

DESCRIPTION OF THE PREFERRED EMBODIMENTS

Figure 1:
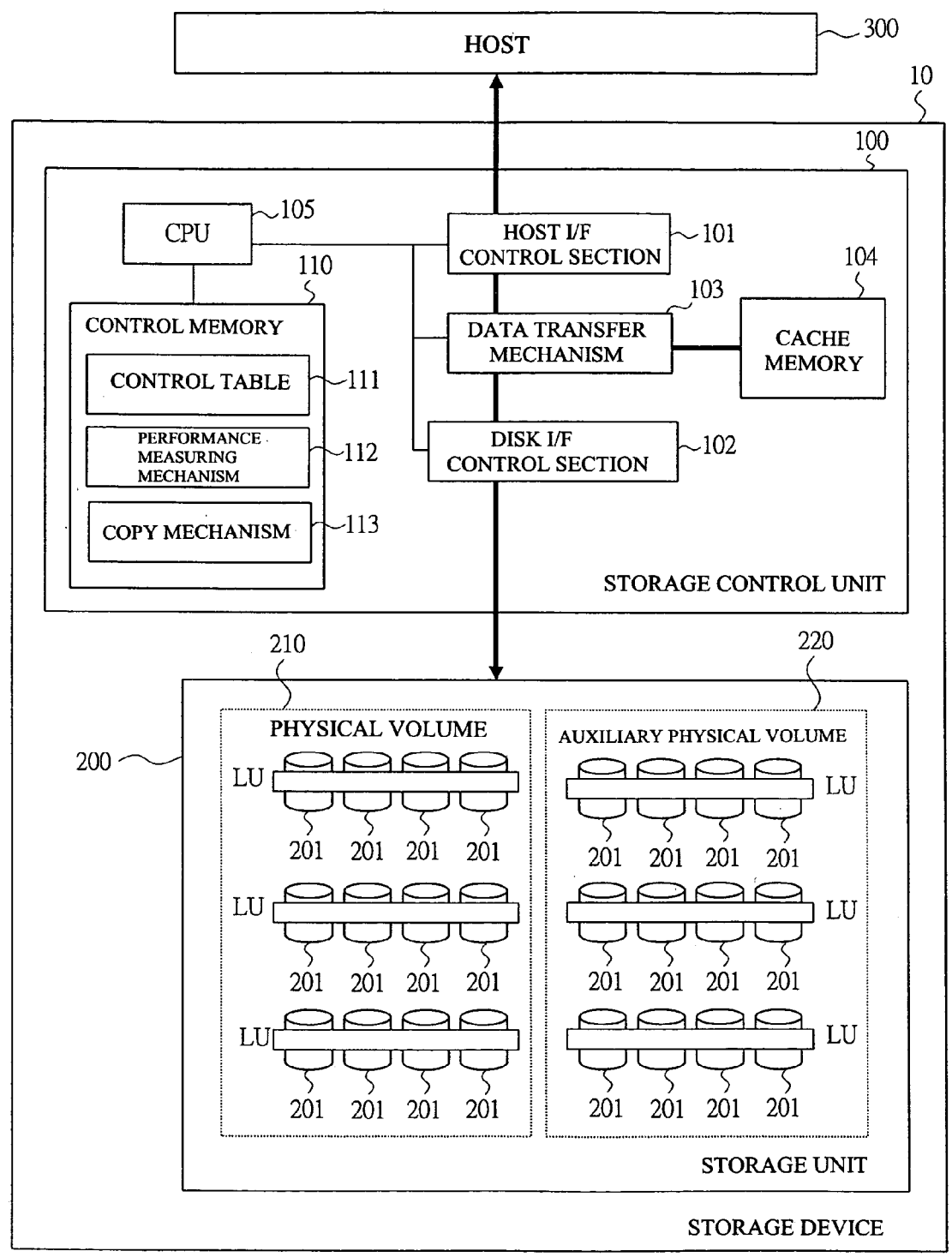
FIG. 1 is a block diagram showing a structure of a storage device according to a first embodiment of the present invention.

Hereinafter, embodiments of the present invention will be detailed based on the drawings. Note that the same member is denoted by the same reference numeral in principle throughout all the drawings for describing the embodiments and the repetitive explanation thereof will be omitted.

First Embodiment

<Structure of Storage Device>

A description will be made of structure of a storage device according to a first embodiment of the present invention with reference to FIG. 1. FIG. 1 is a block diagram showing a structure of storage device according to a first embodiment of the present invention.

In FIG. 1, a storage device 10 comprises a storage control unit 100 and a storage unit 200.

The storage control unit 100 comprises a host interface (I/F) control section 101, a disk I/F control section 102, a data transfer mechanism 103, a cash memory 104, a central processing unit (CPU) 105, and a control memory 110.

The host I/F control section 101 is provided with a communications interface for establishing communication with a host (upper apparatus) 300, and has a function of exchanging a data input/output command etc. with the host 300.

The disk I/F control separation 102 is communicatably connected to a plurality of physical disk drives 201 storing the data and controls the storage unit 200.

The data transfer mechanism 103 executes a data transfer processing between the host 300 and the storage unit 200.

The cache memory 104 temporarily stores data transmitted and received between the host 300 and the storage unit 200.

The CPU 105 controls the host I/F control section 101, the disk I/F control section 102, and the data transfer mechanism 103 on the basis of information within the control memory 110, and controls transmission and reception of data between the host 300 and the storage unit 200.

Note that the CPU 105 can be operated by CPUs etc. within the host I/F control section 101 and the disk I/F control section 102.

The storage unit 200 is provided with a plurality of physical disk drives 201, and a drive control section for the plurality of physical disk drives 201. Accordingly, a large capacity memory region can be provided to the host 300. The physical disk drive 201 can be constituted by a data memory medium such as a hard disk drive, or a plurality of hard disk drives constructing a redundant array of inexpensive disks (RAID), or the like. Further, a logical volume (hereinafter abbreviated as "LU"), which is a logical memory region, can be set in a physical volume 210 that is a physical memory region provided by the physical disk drive 201. Moreover, in addition to the physical volume 210, an auxiliary physical volume 220 for executing a load distribution processing of the LU set in the physical volume 210 is provided.

Within the control memory 110 of the storage control unit 100, there is stored data of: a control table 111 for controlling a transfer of data between the host 300 and the storage unit 200; a performance measuring mechanism 112 composed of, for example, a processing program etc. within is processed by the CPU 105 and executes a performance measuring processing to the LU set in the physical volume 210 of the storage unit 200; and a copy mechanism 113 composed of, for example, a processing program etc. which is processed by the CPU 105 and executes a copying processing between the LU set in the physical volume 210 of the storage unit 200 and the LU set in the auxiliary physical volume 220.

The performance measuring mechanism 112, for example, measures a processing capacity etc. with respect to the LU set in the physical volume 210 of the storage unit 200 by a counter etc. measuring a data transfer amount (throughput) and a processing command number (transaction) etc. in the data transfer mechanism 103, and determines whether a copy of the LU should be created by the auxiliary physical volume 220 in accordance with a threshold value set based on a value of the marginal performance of the LU.

A counter used in the performance measuring mechanism 112 may be hardware provided in the data transfer mechanism 103, or may measure a data amount etc. processed by the data transfer mechanism 103 using a software counter.

The copy mechanism 113 creates a copy of he LU in the physical volume 210, in the auxiliary physical volume 220, on the basis of the determination of the performance measuring mechanism 112. The copied LU of the LU in the physical volume 210, which is created in the auxiliary physical volume 220, can be generated as a threefold or fourfold copy in accordance with a load condition, in addition to a twofold copy.

Note that the performance measuring mechanism 112 and the copy mechanism 113 may be stored not in the control memory 110 but in other memory section, and/or their functions may be executed therein.

<Outline of Load Distribution Processing>

Figure 2:
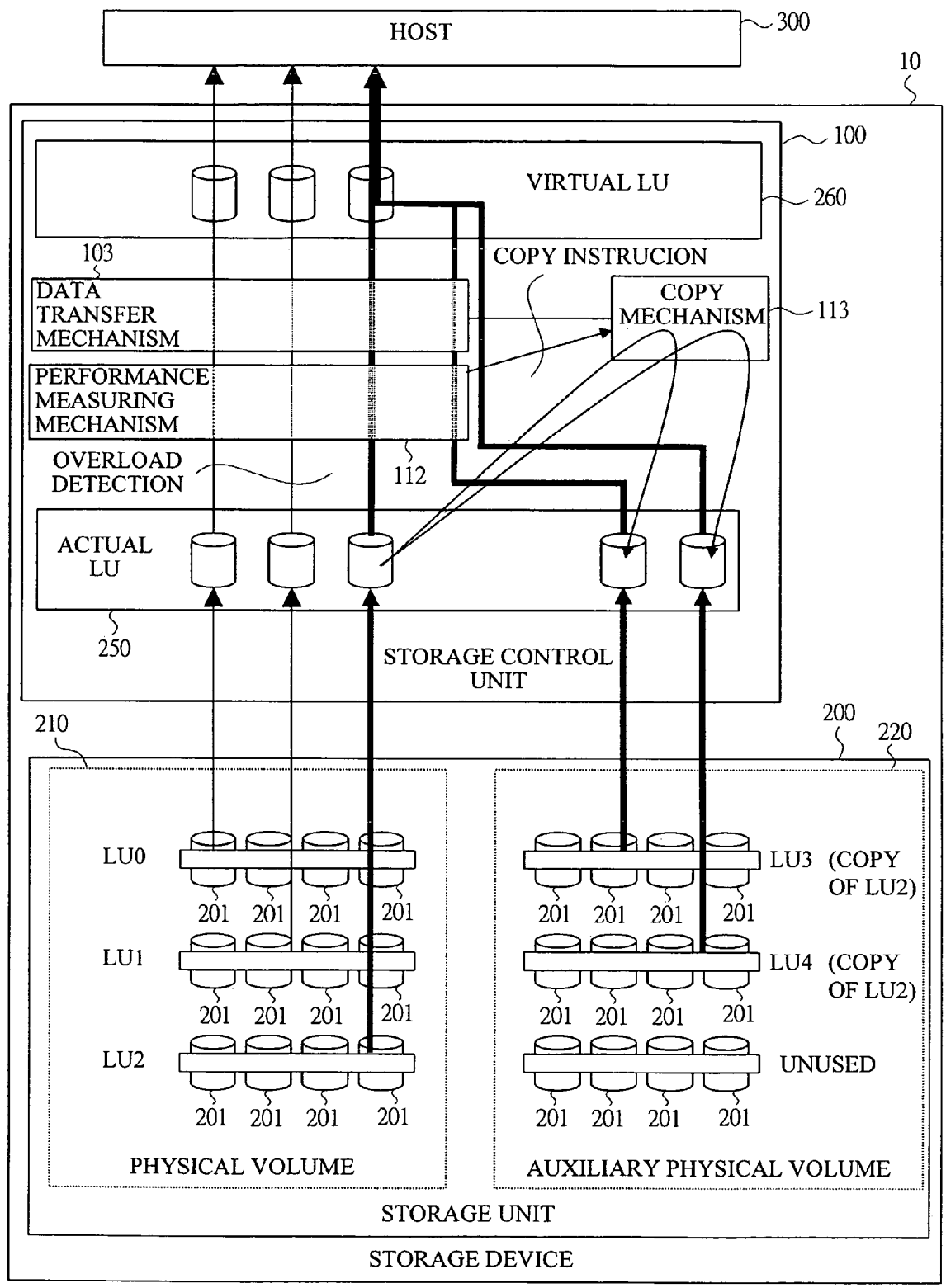
FIG. 2 is an explanatory view for describing a load distribution processing of a storage device according to a first embodiment of the present invention.

An outline of the load distribution processing of the storage device according to the first embodiment of the present invention will be described with reference to FIG. 2. FIG. 2 is an explanatory view for describing the load distribution processing of the storage device according to the first embodiment of the present invention.

In FIG. 2, the storage control unit 100 is provided with a function of: controlling, as an actual LU 250, each of the LUs of the physical volume 210 and the auxiliary physical volume 210 and the auxiliary physical volume 220 in the storage unit 200; and further providing, as one virtual LU having been virtually formed, a plurality of LUs to the host 300, thereby allowing the host 300 to recognize the LU of the copied physical volume 210 and the LU of the auxiliary physical volume 220 as one virtual LU 260 by the copy mechanism 113.

For this reason, on a side of the host 300, a data access processing is applied to the LU provided as a virtual LU, and an access to the LU multiplexed by the copy mechanism 113 can be executed without recognizing the structure of the actual LU in the storage control unit 100 (i.e., in a state of not recognizing the upper apparatus).

First, if each of the LUs (LU0, LU1, and LU2) in the physical volume 210 is in a normal access state, the actual LU 250 of each of the LUs is provided as the virtual LU 260 as it is to the host 300.

Further, the performance measuring mechanism 112 measures a data amount processed by the data transfer mechanism 103 with respect to each of the LUs, and measures the processing capacity with respect to each of the LUs.

Also, a user of the storage device 10 sets a threshold value for starting a mirror generation (e.g., a load ratio (%) to the marginal performance of the LU), and the mirror is automatically generated if exceeding the threshold value. If other LU already uses the mirror and there is no vacancy, the mirror of the LU having the lowest load or having a mirror generation lower in priority is cancelled and the cancelled mirror region is used. Further, a threshold value for cancelling the mirror is set, and the mirror LU is cancelled if the load is reduced.

FIG. 2 shows an example in which the data amount to the LU2 in the physical volume 210 exceeds the threshold value set based on the marginal performance value of the LU. In this case, the performance measuring mechanism 112 outputs a copy instruction to the actual LU 250 in the auxiliary physical volume 220 from the actual LU 250 in the physical volume 210, with respect to the copy mechanism 113, and generates the copy of the LU2 into the LU of the auxiliary physical volume 220 (e.g., LU3 and LU4), within the actual LU 250.

Further, the LU2 in the physical volume 210 and the LU copied in the auxiliary physical volume 220 (LU3 and LU4) recognize the virtual LU 260 as the same LU as the LU2 in the physical volume 210 on a side of the host 300.

With respect to the access of the data to the LU2 from the host 300, since the access is distribute into the LU2 in the physical volume 210 and the LU3 and LU4 in the auxiliary physical volume 220, the performance of the LU can be expanded even if the processing capacity of the LU2 reaches the critical limit by the access from the host 300. In addition, the data access processing can be applied to the host 300 in the same manner as the normal process without recognizing the LU copy processing etc. within the actual LU 250.

Moreover, instead of automatically generating the mirror of the LU in the physical volume 210, the user can also output a copy start instruction by the information from the storage device 10. More specifically, the copy is started in advance by forecasting a future performance increase based on history information on the performance load occurring to a certain time point and then anticipating the copy time. The mirror LU may be cancelled automatically if the load applied to the LU becomes low, or the user may output the cancel instruction on the basis of the information from the storage device 10.

Further, in an operation aspect in which a high load time is generated periodically, the copy start instruction may be outputted periodically by a timer star or may be outputted at a time when the high load time starts, whereby the mirror LU is generated and the mirror LU may be cancelled at a time when the high load time is finished.

<Contents of Control Table>

Next, a description will be made of contents of a control table 111 of the storage device according to the first embodiment of the present invention with reference to FIGS. 3 to 5. FIG. 3 is a view showing a virtual-LU-and-actual-LU mapping table in the control table 111 of the storage device according to the first embodiment of the present invention, FIG. 4 is a view showing a performance monitoring table in the control table 111 of the storage device according to the first embodiment of the present invention, and FIG. 5 is a view showing an auxiliary physical volume control table in the control table 111 of the storage device according to the first embodiment of the present invention.

The virtual-LU-and-actual-LU mapping table shown in FIG. 3 is a table showing a corresponding relation between the virtual LU 260 and the actual LU 250, and is configured by the number of actual LUs (e.g., 3) mapped in a certain virtual LU (e.g., LU2) and information on the mapped actual LU (e.g., LU2, LU3, or LU4). The control of the virtual LU and the processing of the virtual LU are executed by using the virtual-LU-and-actual-LU mapping table, and the virtual LU can be provided without recognition of the actual LU by the host 300.

The performance monitoring table shown in FIG. 4 is a table illustrating a load condition of the actual LU, and is configured by the number of processing commands (transaction) per unit time with respect to the actual LU, and information on an amount of data processed (throughput) per unit time. It is possible to determine whether the actual LU is in an overload state, in accordance with a threshold value previously set based on the marginal performance value of the LU using the performance monitoring table.

The auxiliary physical volume control table shown in FIG. 5 is a table illustrating the actual LU during use of an auxiliary region in the auxiliary physical volume 220, and is configured by an auxiliary-region-using actual LU number within the auxiliary physical volume 220, and a copy-source actual LU number of the auxiliary-region using actual LU number of the auxiliary-region using actual LU in the physical volume 210.

In order to determine order of priority for generating a copy volume, it is possible to add information for expressing a priority to the auxiliary physical volume control table.

<Operation of Copy LU Generation>

Figure 6:
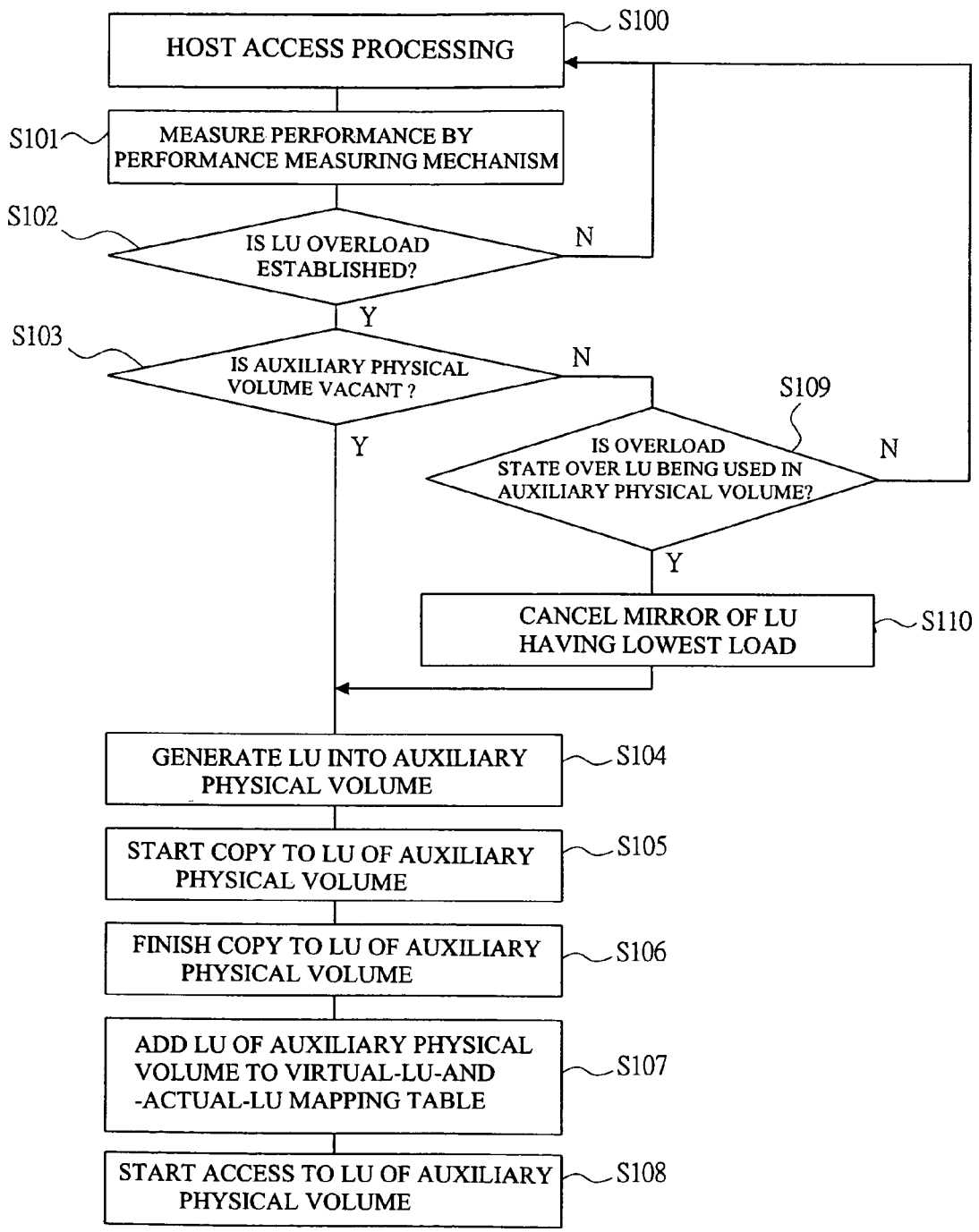
FIG. 6 is a flow chart showing an example of a copy LY generating operation of a storage device according to a first embodiment of the present invention.
Figure 7:
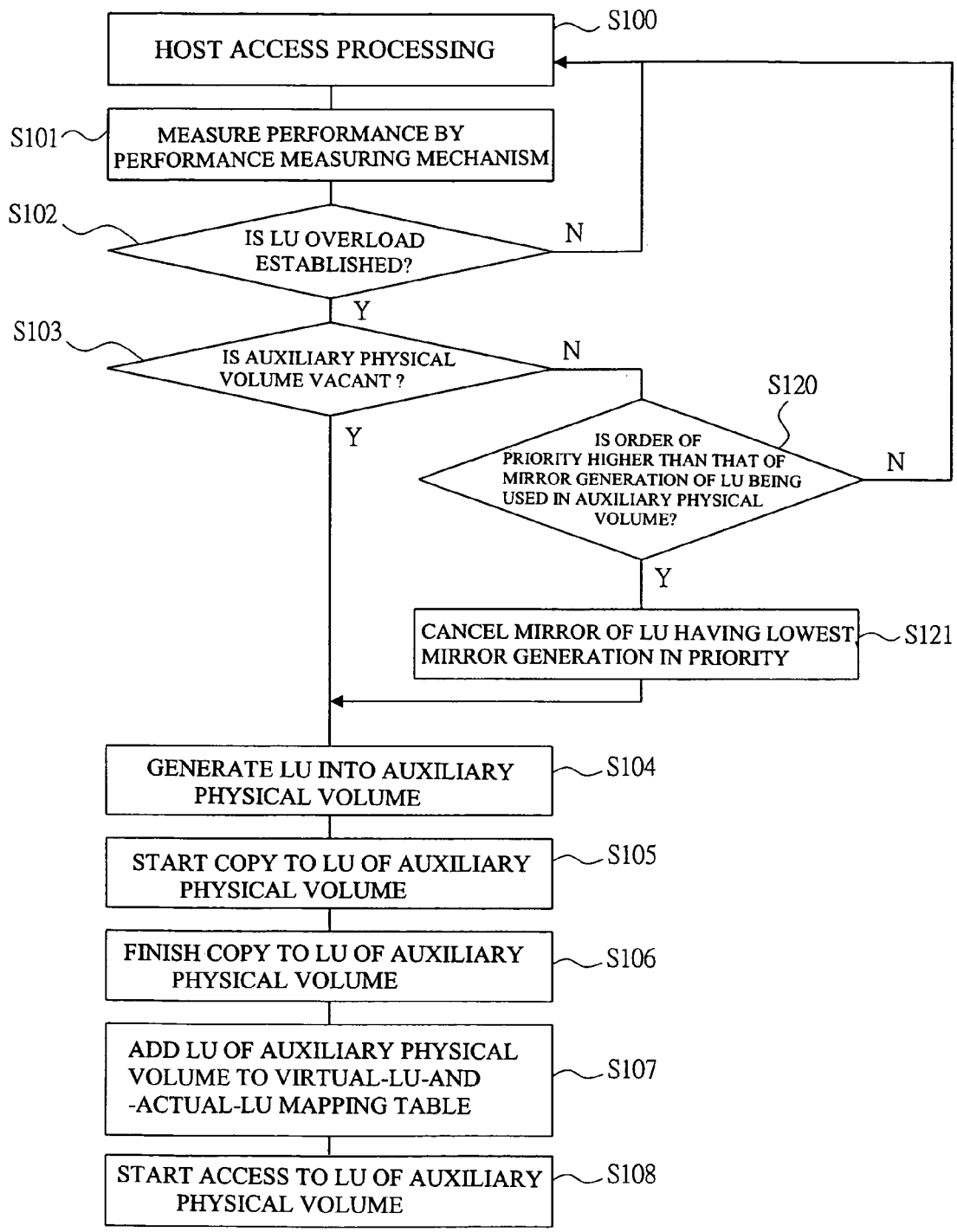
FIG. 7 is a flow chart showing another example of a copy LU generating operation of a storage device according to a first embodiment of the present invention.

Next, a description will be made of a copy LU generating operation of the storage device according to the first embodiment of the present invention with reference to FIGS. 6 and 7. FIG. 6 is a flow chart showing an example of a copy LU generating operation of the storage device according to the present invention, and FIG. 7 is a flow chart showing another example of a copy LU generating operation of the storage device according to the first embodiment of the present invention.

First, as shown in FIG. 6, if no vacancy is provided in the auxiliary physical volume 220 at a time of generating the copy LU in the auxiliary physical volume 220, an operation of canceling the mirror of the LU in the auxiliary physical volume 220 in accordance with the overload state of the LU within the auxiliary physical volume 220 includes: executing a host access processing to the host 300 (S100); and executing performance measurement with respect to the LU by the host access processing in S100 using the performance measuring mechanism 112 (S101).

As a result of the performance measurement in S101, it is determined in accordance with the preset threshold value for starting the mirror generation whether an LU overload is established (S102). If it is determined in S102 that the LU overload is not established, a procedure returns to S100. If it is determined in S102 that the LU overload is established, it is determined whether any vacancy is provided in the LU within the auxiliary physical volume 220 (S103).

If it is determined in S103 that the vacancy is provided in the LU within the auxiliary physical volume 220, an LU to be copied from the physical volume 210 within the auxiliary physical volume 220 is generated (S104) and a copy to the LU generated by S104 within the auxiliary physical volume 220 is started (S105).

Also, when the copy to the LU generated by S104 within the auxiliary physical volume 220 is completed (S106), the LU within the auxiliary physical volume 220 is added to the virtual-LU-and-actual-LU mapping table within the control table 111 (S107) and an access to the LU within the auxiliary physical volume 220 is started (S108), whereby a mirror state is established with the LU of the physical volume 210.

Further, if it is determined in S103 that no vacant is provided in the LU within the auxiliary physical volume 220, it is determined whether the above-mentioned LU is overloaded in comparison with the LU used within the auxiliary physical volume 220 (S109). If it is determined in S109 that it is not overloaded in comparison with the LU used within the auxiliary physical volume 220, the procedure returns to S100. If it is determined in S109 that it is overloaded in comparison with the LU used within the auxiliary physical volume 220, the mirror of the LU having the lowest load within the auxiliary physical volume 220 is cancelled and a vacancy of LU is generate within the auxiliary physical volume 220 (S110), so that the procedure after S104 is executed.

In the case where the LU becomes in the overload state as a result of the measurement by the performance measuring mechanism 112 through the above-mentioned procedure, the LU is generated in the auxiliary physical volume 220 and the contents of the LU of the physical volume 210 are copied and the LU is provided to the host 300 as a virtual LU that is in a mirror state.

For this reason, on a side of the host 300, an access to the LU provided as a virtual LU is executed, so that even when the actual LU constituting the virtual LU becomes in the overload state, the access in the state in which the actual LU is load-distributed can be executed.

Also, as shown in FIG. 7, if no vacancy is provided in the auxiliary physical volume 220 at a time of generating the copy LU within the auxiliary physical volume 220, an operation of canceling the mirror of the LU within the auxiliary physical volume 220 by the order of priority for generating the mirror of the LU within the auxiliary physical volume 220 (e.g., the order of priority in the copy source for generating the mirror set in each of the LUs within the physical volume 210) includes the same as the operations as shown in FIG. 6 except for those of S109 and S110.

As an operation different from those shown in FIG. 6, if it is determined in S103 that no vacancy is provided in the LU within the auxiliary physical volume 220, it is determined whether its order of priority is higher than that for generating the mirror of the LU used within the auxiliary physical volume 220 (S120). If it is determined in S120 that its order of priority is not higher than that for generating the mirror of the LU used within the auxiliary physical volume 220, the procedure returns to S100. Or, if it is determined in S120 that its order of priority is higher than that for generating the mirror of the LU used within the auxiliary physical volume 220, the mirror of the LU having the mirror generated at the lowest order of priority within the auxiliary physical volume 220 is cancelled and generates a vacancy of the LU within the auxiliary physical volume 220 (S121) and then the procedures after S104 are executed.

If the LU becomes in an overload state as a result of the measurement by the performance measuring mechanism 112 through the above-mentioned procedure, an LU is generated in the auxiliary physical volume 220 and the contents of the LU in the physical volume 210 are copied and the LU is provided to the host 300 as the virtual LU that is in the mirror state.

Accordingly, on a side of the host 300, even when the actual LU constituting the virtual LU becomes in an overload state by the access to the LU provided as the virtual LU, it is possible to execute the access in a state in which the actual LU is load-distributed.

Further, by setting the order of priority for generating the mirror with respect to the LU, the order of priority for generating the mirror of the LU intending to provide the maximum access capacity is made higher with respect to the access from the host 300, whereby the load distribution by the copy of the LU can be executed by priority.

<Mirror Canceling Operation of LU>

Figure 8:
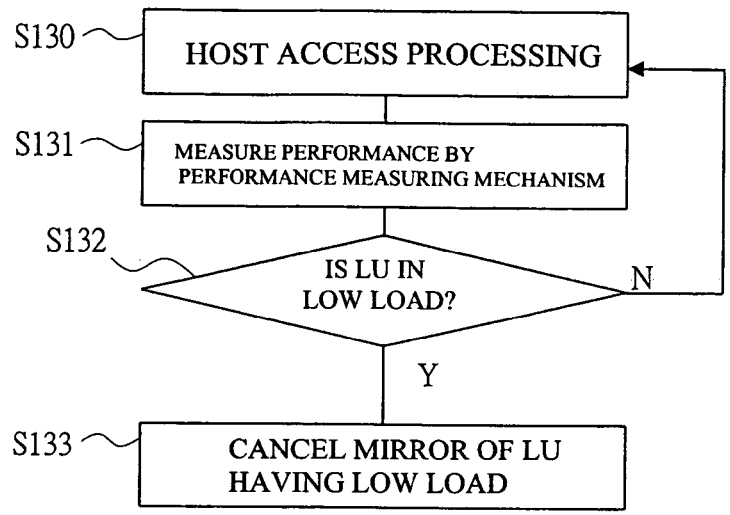
FIG. 8 is a flow chart showing, at a time of a low load after generating a copy LU, a LU mirror releasing operation of a storage device according to a first embodiment of the present invention.

Next, a description will be made of a mirror canceling operation of the LU at a time of a low load of the storage device according to the first embodiment of the present invention with reference to FIG. 8. FIG. 8 is a flow chart showing, at a time of a low load after generating the copy LU, a mirror canceling operation of the LU of the storage device according to the first embodiment of the present invention.

The mirror canceling operation of the LU at a time of a low load after generating the copy LU includes: first executing a host access processing to the host 300 (S130); and executing the performance measurement to the LU by the host access processing in S130 through the performance measuring mechanism 112 (S131).

As a result of the performance measurement in S131, it is determined in accordance with the preset threshold value for canceling the mirror whether the LU is in a low load state (S132). If it is determined in S132 that the LU is not in a low load state, the procedure returns to S130. If it is determined in S132 that the LU is in a low load state, the mirror of the LU that is in a low load state within the auxiliary physical volume 220 is cancelled (S133).

By the above-mentioned procedure, even if the LU is copied into the auxiliary physical volume 220, the mirror of the LU having thereafter been in a low load state is cancelled, whereby it is possible to achieve the utilization only by the LU within the physical volume 210.

Further, depending on the order of priority for generating the mirror set in the LU within the physical volume 220, the threshold value for canceling the mirror may be lowered or the mirror cancellation may be not executed.

<Read Processing Operation to LU>

Figure 9:
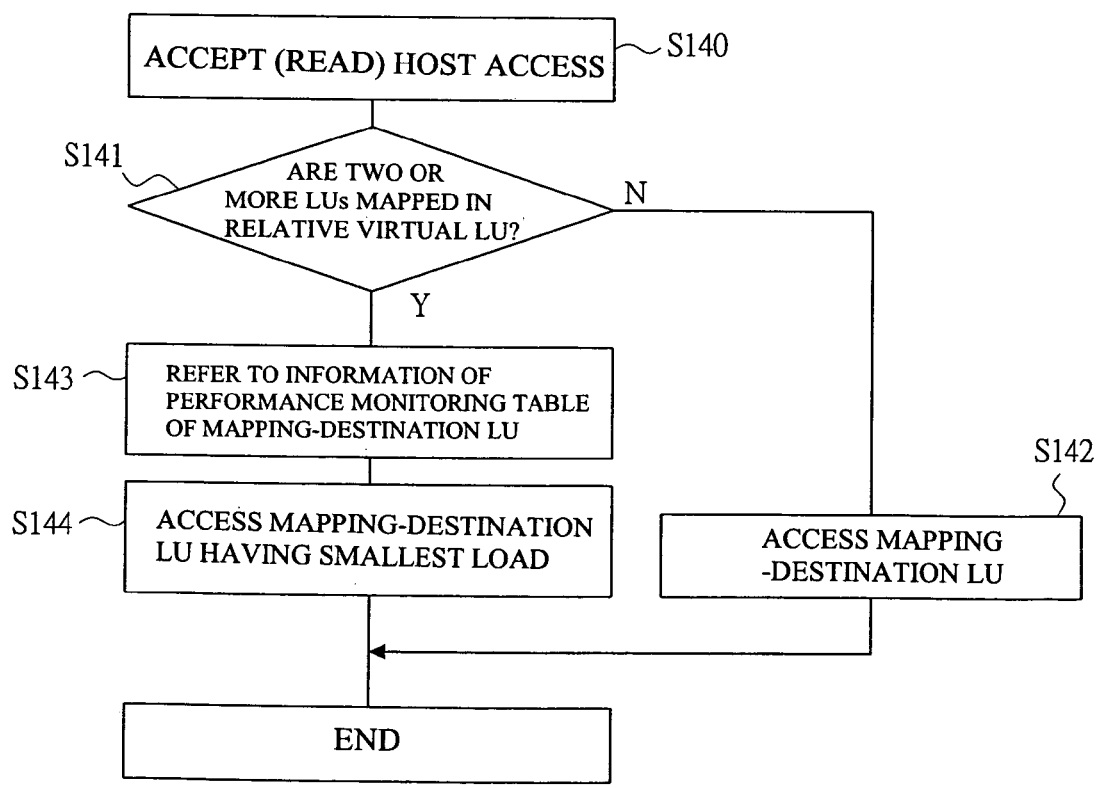
FIG. 9 is a flow chart showing a read processing operation to LU in a storage device according to a first embodiment of the present invention.

Next, a description will be made of a read processing operation of the LU of the storage device according to the first embodiment of the present invention with reference to FIG. 9. FIG. 9 is a flow chart showing a read processing operation to the LU of the storage device according to the first embodiment of the present invention.

A read processing to the LU of the storage device 10 includes: first receiving a host access of read with respect to the LU from the host 300 (S140); and determining, with reference to the virtual-LU-and-actual-LU mapping table of the control table 111, whether two or more LUs are mapped in the above virtual LU corresponding to the host access (S141).

Then, if it is determined in S141 that two or more LUs are not mapped in the above virtual LU corresponding to the host access, i.e., if only the LU within the physical volume 210 is mapped, a mapping-destination LU is accessed (S142).

Further, if it is determined in S141 that two or more LUs are mapped in the above virtual LU corresponding to the host access, i.e., if the LU within the physical volume 210 is copied into the LU within the auxiliary physical volume 220 and becomes in a mirror state, the information on the performance monitoring table of the control table 111 corresponding to the mapping-destination LU is referred to (S143) and a mapping-destination LU having the smallest load is accessed (S144).

A load-distributing method includes a method of determining a sequential property, keeping the sequential property of the access to each of the physical volumes, and drawing out marginal transfer performance of the drive, and a suitable load-distributing algorithm is used in accordance with an application.

By the above-mentioned procedure, if two or more LUs are mapped in the virtual LU on the basis of the copy LU generating processing, the host 300 accesses the mapping-destination LU having the smallest load, whereby the load applied to the LU can be distributed.

<Write Processing Operation to LU>

Figure 10:
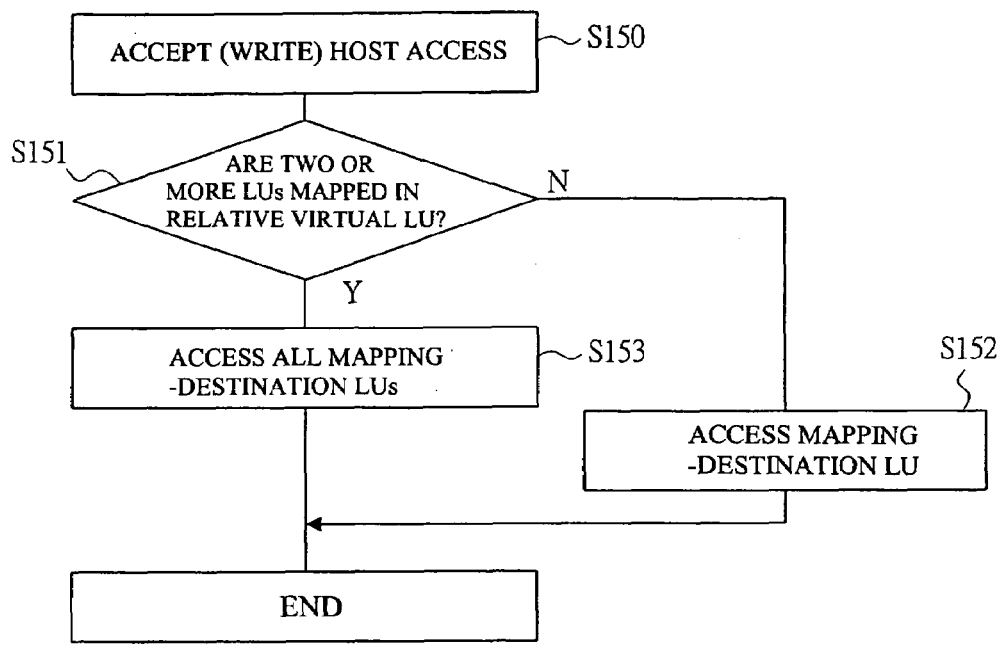
FIG. 10 is a flow chart showing an example of a write processing operation to LU in a storage device according to a first embodiment of the present invention.
Figure 11:
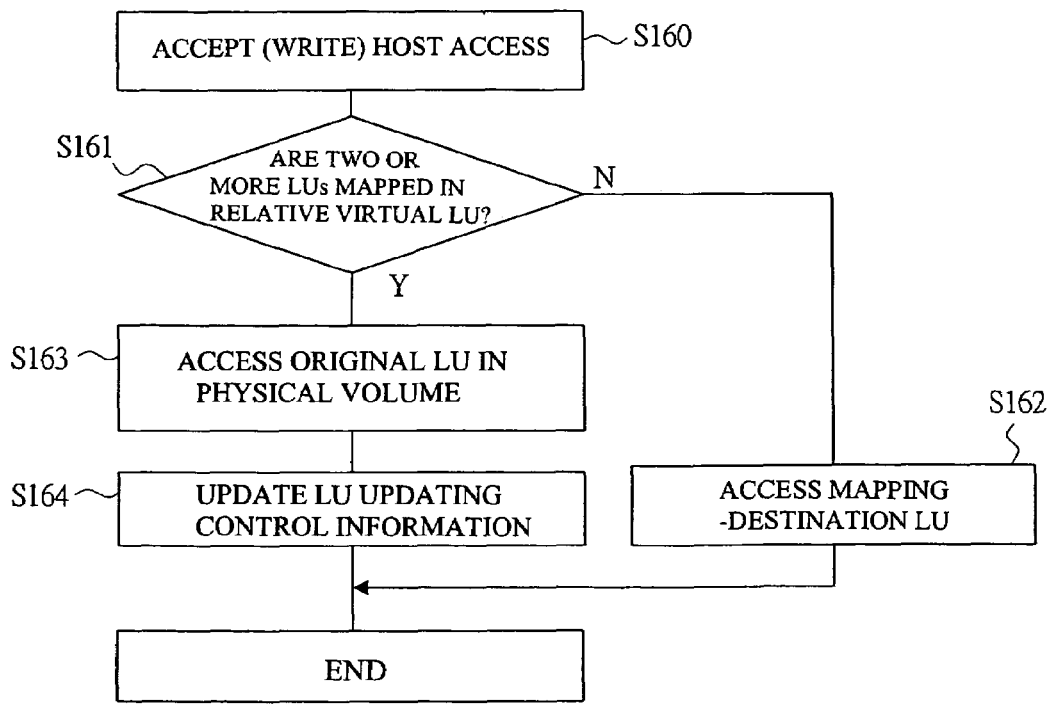
FIG. 11 is a flow chart showing another example of a write processing operation to LU in a storage device according to a first embodiment of the present invention.

Next, a description will be made of a write processing operation to the LU of the storage device according to the first embodiment of the present invention with reference to FIGS. 10 and 11. FIG. 10 is a flow chart showing an example of the write processing operation to the LU of the storage device according to the first embodiment of the present invention, and FIG. 11 is a flow chart showing another example of the write processing operation to the LU of the storage device according to the first embodiment of the present invention.

In the present embodiment, a write processing to the LU employing either of a method of accessing all the LU within the physical volume 210 and the LU within the physical volume 220 in which the LU within the physical volume 210 is copied in the same manner as the processing applied to the normal mirror volume, thereby updating all the LU data, and a method of accessing an original LU within the physical volume 210 with respect to the host access of the write, updating the data of only the original LU, storing LU-updating control information (LU-updating control bit map) indicating the update, for example, storing it in the control table 111, and accessing the original LU within the physical volume 210 with respect to the updated data on the basis of the LU-updating control information at a time of reading.

First, in the case of accessing all an LU within the physical volume 210 and an LU within the auxiliary physical volume 220 in which the LU within the physical volume 210 is copied, as shown in FIG. 10, the host access of the write with respect to the LU from the host 300 (S150) is received and it is determined whether two or more LUs are mapped in the relative virtual LU corresponding to the host access with reference to the virtual-LU-and-actual-LU mapping table of the control table 111 (S151).

Then, it is determined in S151 that two or more LUs are not mapped in the relative virtual LU corresponding to the host access, the mapping destination LU is accessed (S152).

Further, it is determined in S151 that two or more LUs are mapped in the relative virtual LU corresponding to the host access, all the mapping-destination LUs are accessed (S153).

By the above-mentioned procedure, if two or more LUs are mapped in the virtual LU on the basis of the copy LU generating processing, the write data by the host access from the host 300 is written in all the LUs mapped in the virtual LU, whereby all the LUs are updated. Accordingly, even when the write processing is executed to the LU, it is possible to apply the load distribution to the updated data.

Also, in the case of accessing the original LU within the physical volume 210, as shown in FIG. 11, the host access of the write is received with respect to the LU (S160) from the host 300 and it is determined with reference to the virtual-LU-and-actual-LU mapping table of the control table 111 whether two or more LUs are mapped in the relative virtual LU corresponding to the host access (S161).

Then, if it is determined that two or more LUs are not mapped in the relative virtual LU corresponding to the host access, the mapping-destination LU is accessed (S162).

Also, if it is determined in S161 that two or more LUs are mapped in the relative virtual LU corresponding to the host access, the original LU within the physical volume 210 is accessed (S163) and the LU-updating control information is updated (S164).

By the above-mentioned procedure, if two or more LUs are mapped in the virtual LU through the copy LU generating processing, write data by the host access from the host 300 is written in the original LU within the physical volume 210 out of all the LUs mapped in the virtual LU and only the original LU is updated and the information on the update is controlled as the LU updating control information. Further, the LU updating control information is referred to at a time of reading, and the updated data is accessed to the original LU within the physical volume 210.

Also, if the information controlled by the LU updating control information is increased and the updating amount exceeds a certain threshold value, a processing for load-distributing the LU within the auxiliary physical volume 220 is not executed efficiently, so that the mirror is again formed after temporarily canceling and breaking the mirror LU and relocating it.

Accordingly, if the write processing is executed to the LU, it becomes only an access to the LU within the physical volume 210 and the processing amount is reduced, so that the access to the data which is not updated can be load-distributed.

<Information Provision to User and Parameter Input from User>

In the present embodiment, various pieces of information is displayed on, for example, a display unit within the storage control unit 100, a control terminal, or the like to the user, and a parameter input from the user is applied from an input unit etc. within the storage control unit 100.

Next, a description will be made of an example of display contents of the various pieces of information and the parameter input.

First, for example, the following information is displayed as display contents per each of the LUs:

Marginal performance value (throughput and transaction);

Change (history) of a load rate to a load condition (throughput and transaction) and marginal performance with time;

With or without use of mirror LU and the number of mirror LU; and

Load condition to mirror LU.

The user can check the marginal performance of each of the LUs and the load condition with respect to each of the LUs on the basis of the display contents.

Also, for example, the following set parameter items are displayed as the contents of the parameter input per each of the LUs, and the parameter input from the user is accepted:

Selection of Enable/Disable of an LU internal mirror according to the present embodiment;

Mode change among automatic mirror generation/manual mirror generation/regular mirror generation;

Upper limit value of generation mirror LU;

Performance threshold value for staring generating an internal mirror and canceling a mirror (percentage to marginal performance of LU); and Order of priority for generating mirror.

It is possible to set an operation of generating the mirror with respect to each of the LUs on the basis of this parameter input.

Also, as the accepted contents of the instruction for generating the manual mirror, the mirror generating instruction is accepted, for example, on the basis of the operation of generating the manual mirror such as designation of the LU number from the user, and the copy processing is executed based o the instruction.

<Region Specification and Recovery at Failure>

Next, a description will be made of a region specification and recovery at a time of failure of the storage device according to the first embodiment of the present invention.

In the present embodiment, if disk failure is generated in the physical disk drive 201 within the physical volume 210 or the auxiliary physical volume 220 and a trouble in the physical disk drive 201 is detected, a recovery processing is executed based on, for example, redundancy by RAID.

Also, in the case where disk failure is generated in a plurality of physical disk drive 201 and the LU cannot be used, when the above-mentioned LU is within the auxiliary physical volume 220, the mirror of the relative LU is cancelled and the LU is regenerated in the different usable region to generate a mirror LU and is allocated, whereby the recovery processing is executed.

Further, if the LU is within the physical volume 210 and if the LU within the auxiliary physical volume 220 is in a complete mirror state, the recovery processing can be executed by: using the LU within the auxiliary physical volume 220 instead of the LU within the physical volume 210; making the LU within the physical volume 210 unusable; gain generating the LU I different usable regions within the physical volume 210; and executing the copy processing of the data from the LU within the auxiliary physical volume 220.

Note that, in the present embodiment, the description has been made of the example in which the load distribution processing is executed by measuring the load condition per LU unit with respect to the LU within the physical volume 210 and the LU within the auxiliary physical volume 220, and accessing the LU having the lowest load. However, the load distribution may be executed by dividing the LU finely (per extension unit) by an address or the like, and accessing the LU having the lowest load per the extension unit.

Second Embodiment

A second embodiment is such that, in the first embodiment, only a difference of the accessed data is copied instead of copying all the LUs within the physical volume 210 to the LU within the auxiliary physical volume 220 when the LU is in an overload state.

The structure of the storage device 10 according to the second embodiment is the same as that of the first embodiment.

<Operation of Generating Copy LU>

Figure 12:
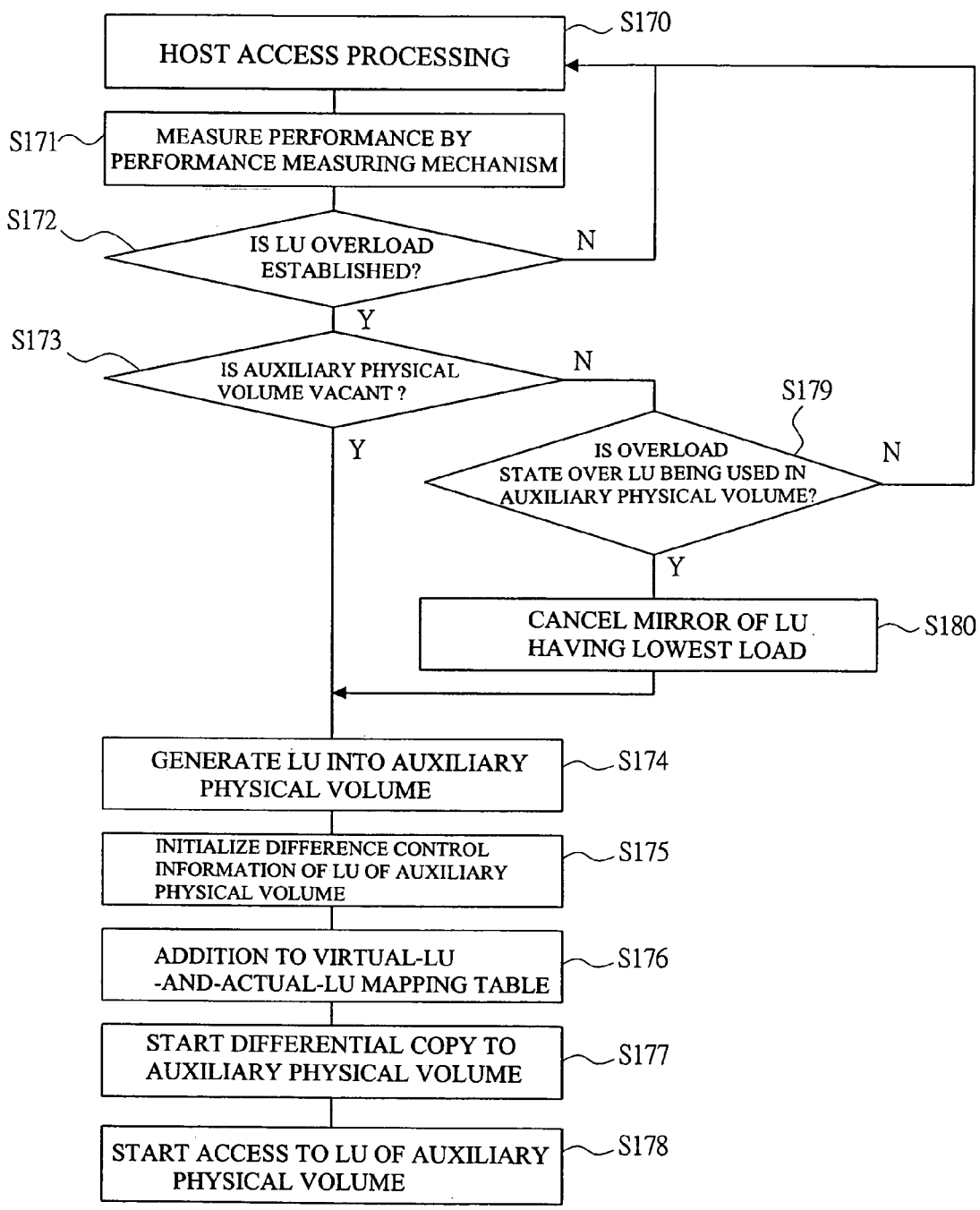
FIG. 12 is a flow chart showing an example of a copy LU generating operation of a storage device according to a second embodiment of the present invention.
Figure 13:
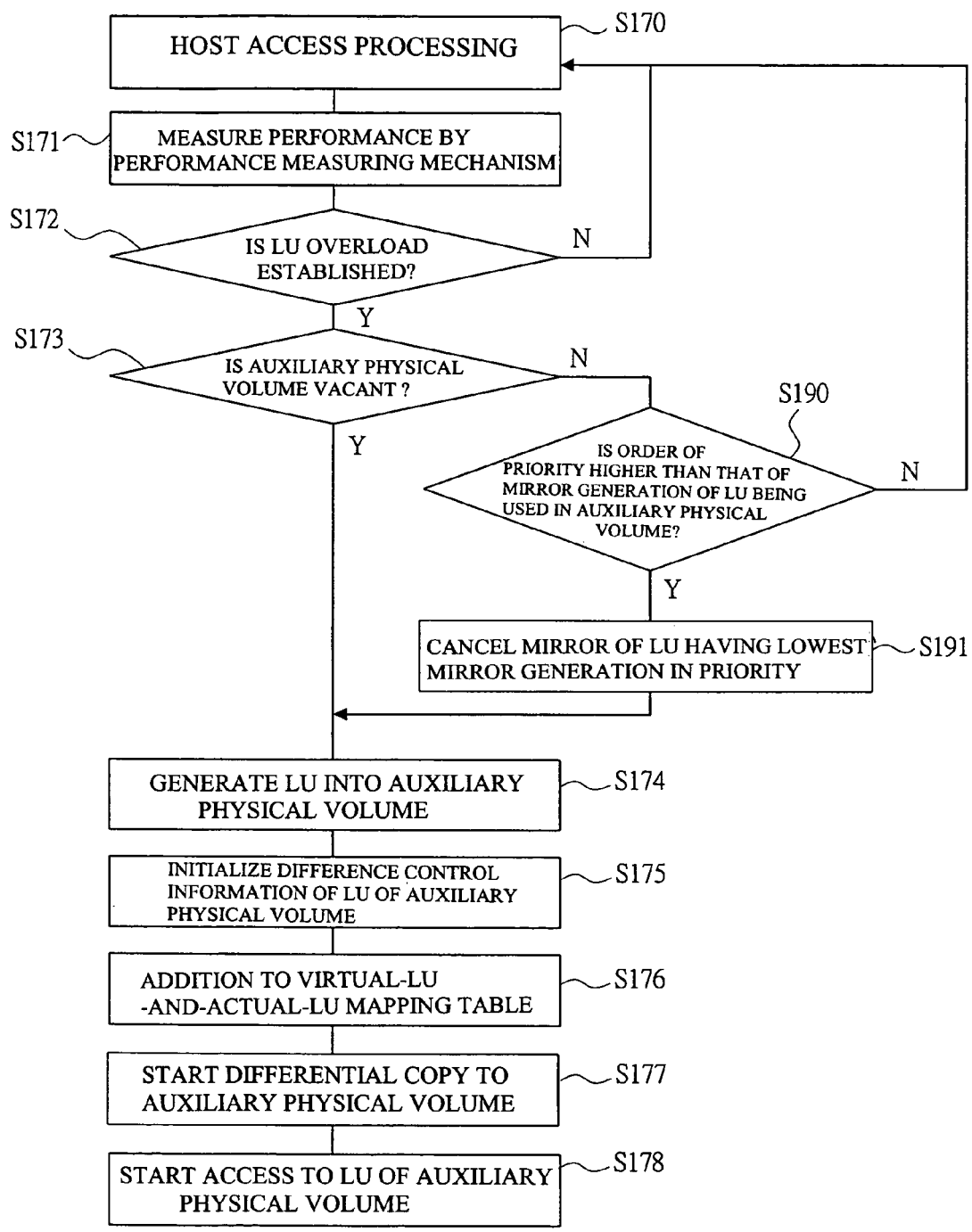
FIG. 13 is a flow chart showing another example of a copy LU generating operation of a storage device according to a second embodiment of the present invention.

Next, a description will be made of an operation of generating a copy LU of a storage device according to the second embodiment of the present invention with reference to FIGS. 12 and 13. FIG. 12 is a flow chart showing an example of the storage device according to the second embodiment of the present invention, and FIG. 13 is a flow chart showing another example of the operation of generating the copy LU of the storage device according to the second embodiment of the present invention.

First, as shown in FIG. 12, if no vacancy is provided in the auxiliary physical volume 220 at a time of generating the copy LU within the auxiliary physical volume 220, an operation of canceling the mirror of the LU within the auxiliary physical volume 220 in accordance with the overload state of the LU within the auxiliary physical volume 220 includes executing a host access processing to the host 300 (S170) and executing performance measurement with respect to the LU by the host access processing in S170 by the performance measuring mechanism 112 (S171).

As a result of measuring the performance in S171, it is determined in accordance with the preset threshold value for starting the mirror generation whether the LU is in an overload state (S172). If it is determined in S172 that the LU is not in an overload state, the procedure returns to S170. If it is determined in S172 that the LU is in an overload state, it is determined whether any vacancy is provided in the LU within the auxiliary physical volume 220 (S173).

Further, if it is determined in S173 that the vacancy is provided in the LU within the auxiliary physical volume 220, the LU to be copied within the auxiliary physical volume 220 is generated from the physical volume 210 (S174) and difference control information (difference control bit map) controlling a copy condition in the auxiliary physical volume 220 is initialized (S175).

The difference control information is stored in, for example, the control memory 110 or the like, and is used at a time of accessing the LU within the auxiliary physical volume 220 to distribute the load.

Further, the LU within the auxiliary physical volume 220 is added to the virtual-LU-and-actual-LU mapping table within the control table 111 (S176), and copying of the difference to the auxiliary physical volume 220 is started on the basis of the access from the host 300 (S177) and the access to the LU within the auxiliary physical volume 220 is started (S178).

Also, if it is determined in S173 that no vacancy is provided in the LU within the auxiliary physical volume 220, it is determined whether the relative LU is overload in comparison with the LU used within the auxiliary physical volume 220 (S179). If it is determined in S179 that the relative LU is not in an overload state in comparison with the LU used within the auxiliary physical volume 220, the procedure returns to S170. If it is determined in S179 that the relative LU is in the overload state in comparison with the LU used within the auxiliary physical volume 220, the mirror of the LU having the lowest load within the auxiliary physical volume 220 is cancelled and a vacancy of LU is generated within the auxiliary physical volume 220 (S180) and the procedure after S174 is executed.

By the above-mentioned procedure, if the LU becomes in an overload state as a result of measurement by the performance measuring mechanism 112, the LU is generated in the auxiliary physical volume 220 and the contents of LU of the physical volume 210 is differentially copied on the basis of the access from the host 300 and the differentially copied data becomes data provided to the host 300.

For this reason, on a side of the host 300, it is possible to execute the access to the LU even during the differential copy and the load distribution processing can be applied to the differentially copied data.

Also, as shown in FIG. 13, if no vacancy is provided in the auxiliary physical volume 220 at a time of generating the copy LU within the auxiliary physical volume 220, an operation of canceling the mirror of the LU within the auxiliary physical volume 220 on the basis of the order of priority for generating the mirror of the LU within the auxiliary physical volume 220 is the same as the operations shown in FIG. 12 except for those of S179 and S180.

Operations different from the operation shown in FIG. 12 include: if it is determined in S173 that no vacancy is provided in the LU within the auxiliary physical volume 220, determining whether the order of priority of such operations is higher than that for generating the mirror of the LU used within the auxiliary physical volume 220 (S190); if it is determined in S190 that it is not higher than that for generating the mirror of the LU used within the auxiliary physical volume 220, the procedure returns to S170; and if it is determined in S190 that it is higher than that for generating the mirror of the LU used within the auxiliary physical volume 220, the mirror of the LU having the lowest mirror in priority within the auxiliary physical volume 220 is cancelled and a vacancy of the LU is generated within the auxiliary physical volume 220 (S191) and the procedure after S174 is executed.

By the above-mentioned procedure, if the LU becomes in an overload state as a result of measurement by the performance measuring mechanism 112, the LU is generated in the auxiliary physical volume 220 and the contents of LU of the physical volume 210 are differentially copied on the basis of the access from the host 300 and the differentially copied data becomes data provided to the host 300.

For this reason, on a side of the host 300, it is possible to execute the access to the LU even during the differential copy and the load distribution processing can be applied to the differentially copied data.

Also by setting the order of priority for generating the mirror with respect to the LU, it is possible to make higher the order of priority for generating the mirror of the LU intending to provide the maximum access capacity with respect to the access from the host 300, so that the load distribution by the copy of the LU is executed by priory.

<Copy Processing During Differential Copy>

Figure 14:
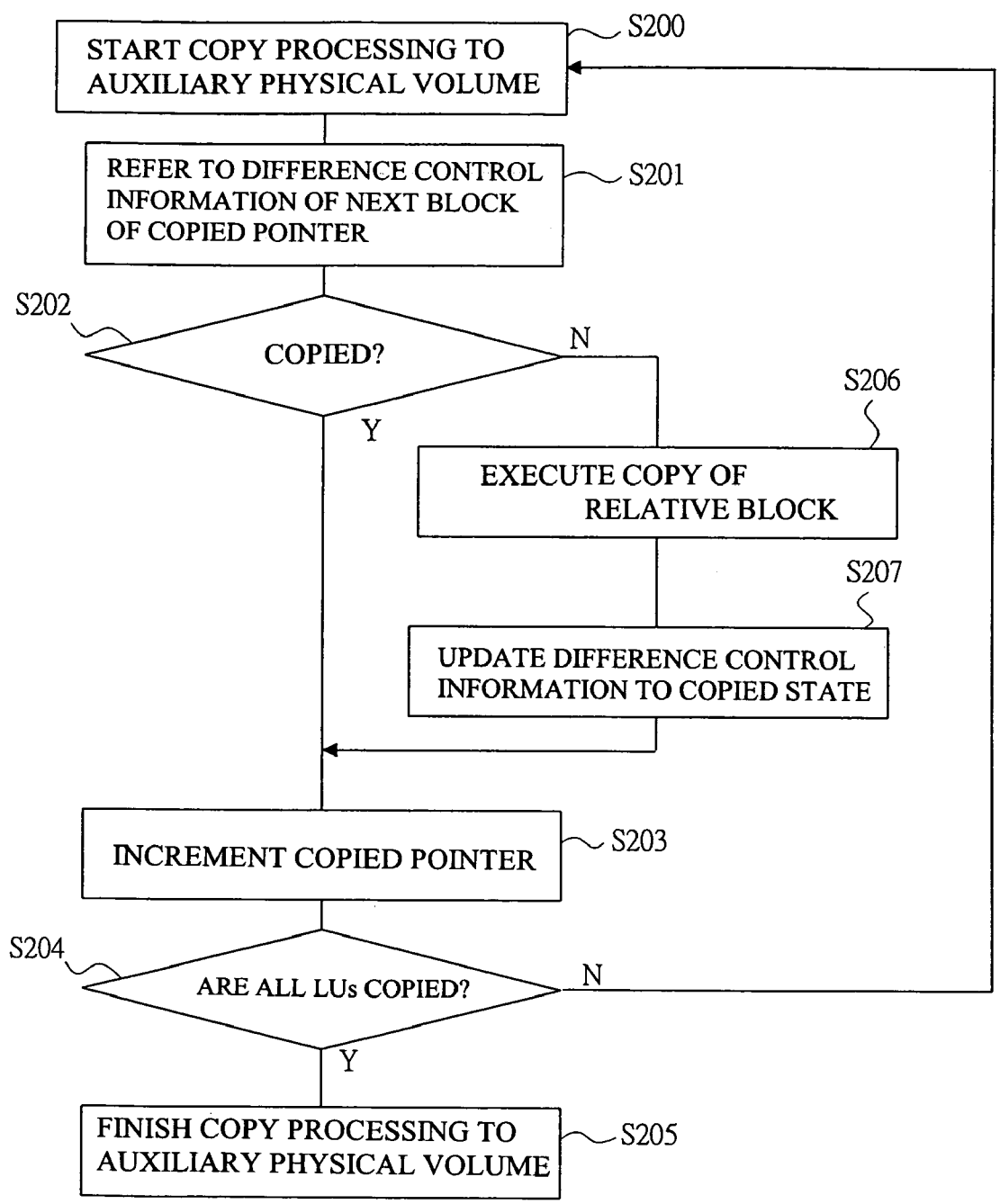
FIG. 14 is a flow chart showing an example of a copy processing operation during a differential copy in a storage device according to a second embodiment of the present invention.

Next, a description will be made of an operation of a copy processing during the differential copy of the storage device according to the second embodiment of the present invention with reference to FIG. 14. FIG. 14 is a flow chart showing an example of an operation of a copy processing during the differential copy of the storage device according to the second embodiment of the present invention.

In the present embodiment, the differential copy is executed from the LU of the physical volume 210 to the LU of the auxiliary physical volume 220, and concurrently, in addition to the differential copy, a processing of sequentially copying the contents of the LU of the physical volume 210 to the LU of the auxiliary physical volume 220 is executed in background by using a copied pointer that indicates a block position copied within the LU.

The copied pointer is stored in, for example, the control memory 110 or the like, and is used at a time of specifying a block to be next copied, or at a time of accessing the LU within the auxiliary physical volume 220 to execute the load distribution.

First, a copy processing to the auxiliary physical volume 220 is started in the background (S200), and difference control information of the next block indicated by the copied pointer is referred to (S201).

Then, it is determined by the difference control information in S201 whether the above-mentioned block is copied (S202). If it is determined in S202 that the block is copied, the copied pointer is incremented (S203) and it is determined whether the copy of the entirety of the LU is completed (S204). If it is determined in S204 that the copy of the entirety of the LU is not completed, a procedure returns to S200. If it is determined in S204 that the copy of the entirety of the LU is completed, the copy processing to the auxiliary physical volume is finished (S205).

Also, if it is determined in S202 that the block is not copied, the above-mentioned copy of the block is executed (S206) and the difference control information of the above block is updated to a copied state (S207) and the procedure after S203 is executed.

Further, if the copy to the auxiliary physical volume 220 is finished, the post-copied state thereof is the same as the state obtained after being copied in the first embodiment is established.

<Read Processing Operation to LU>

Figure 15:
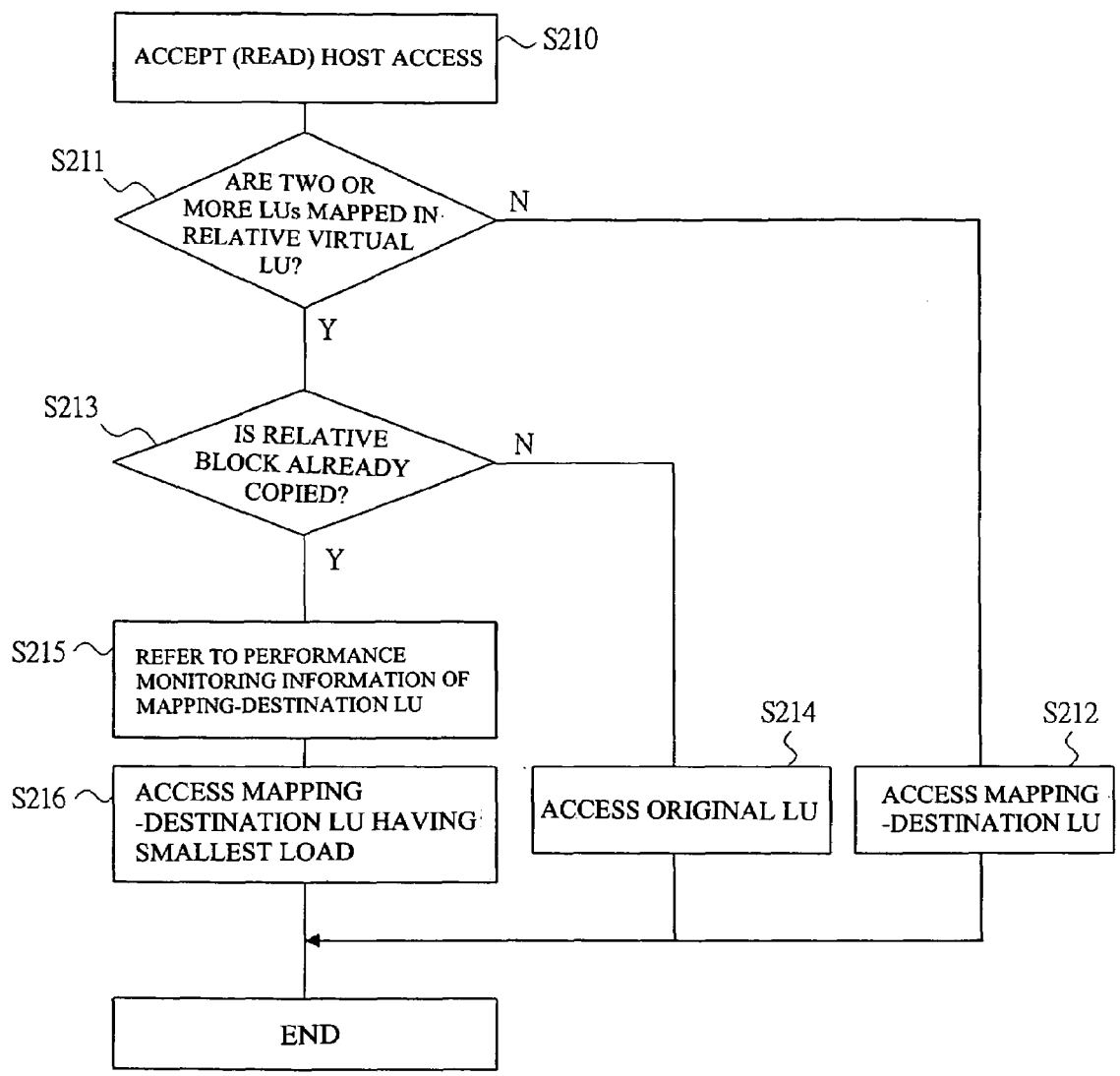
FIG. 15 is a flow chart showing a read processing operation to LU in a storage device according to a second embodiment of the present invention.

Next, a description will be made of a read processing operation to the LU of the storage device according to the second embodiment of the present invention with reference to FIG. 15. FIG. 15 is a flow chart showing a read processing operation to the LU of the storage device according to the second embodiment of the present invention.

The read processing to the LU of the storage device 10 includes: first receiving the host access of read from the host 300 to the LU (S210); and referring to the virtual-LU-and-actual-LU mapping table of the control table 111 to determine whether two or more LUs are mapped in the above-mentioned virtual LU corresponding to the host access (S211).

Then, if it is determined in S211 that two or more LUs are not mapped in the above virtual LU corresponding to the host access, i.e., if only the LU within the physical volume 210 is mapped, the mapping-destination LU is accessed (S212).

Also, if it is determined in S211 that the two or more LUs are mapped in the relative virtual LU corresponding to the host access, the difference control information of the control table 111 is referred to for determining whether the block to be an access object is already copied (S213).

If it is determined in S213 that the above-mentioned block is not copied, the original LU within the physical volume 210 is accessed (S214).

Further, if it is determined in S213 that the above block is already copied, the information of the performance monitoring table of the control table 111 corresponding to the mapping-destination LU (S215) is referred to and the mapping-destination LU having the smallest load is accessed (S216).

By the above-mentioned procedure, if the two or more LUs are mapped in the virtual LU on the basis of the copy LU generating processing, the host access from the host 300 is executed to the mapping-destination LU having the smallest load with respect to the data copied in the auxiliary physical volume 220, so that the load applied to the LU can be distributed.

Also, the read processing after the copy processing shown in FIG. 14 is finished may be executed similarly to that of the first embodiment.

Further, even in the first embodiment, the copy processing as shown in FIG. 14 of the present embodiment may be executed in the background. In this case, the read processing during the copying may be executed by the copy processing shown in FIG. 15. At this time, the determining in S312 whether the copy is already executed may be executed by referring to the copied pointer.

Third Embodiment

An third embodiment is such that a user terminal connected to the storage control unit 100 is provided in the first or second embodiment and the overload of the LU is detected by using a user interface of the user terminal and an instruction for starting the copy is outputted.

The storage device 10 according to the third embodiment has the same structure as that of the first embodiment and has a structure in which the user terminal is connected to the storage control unit 100.

<Operation of Load Distribution Processing>

Figure 16:
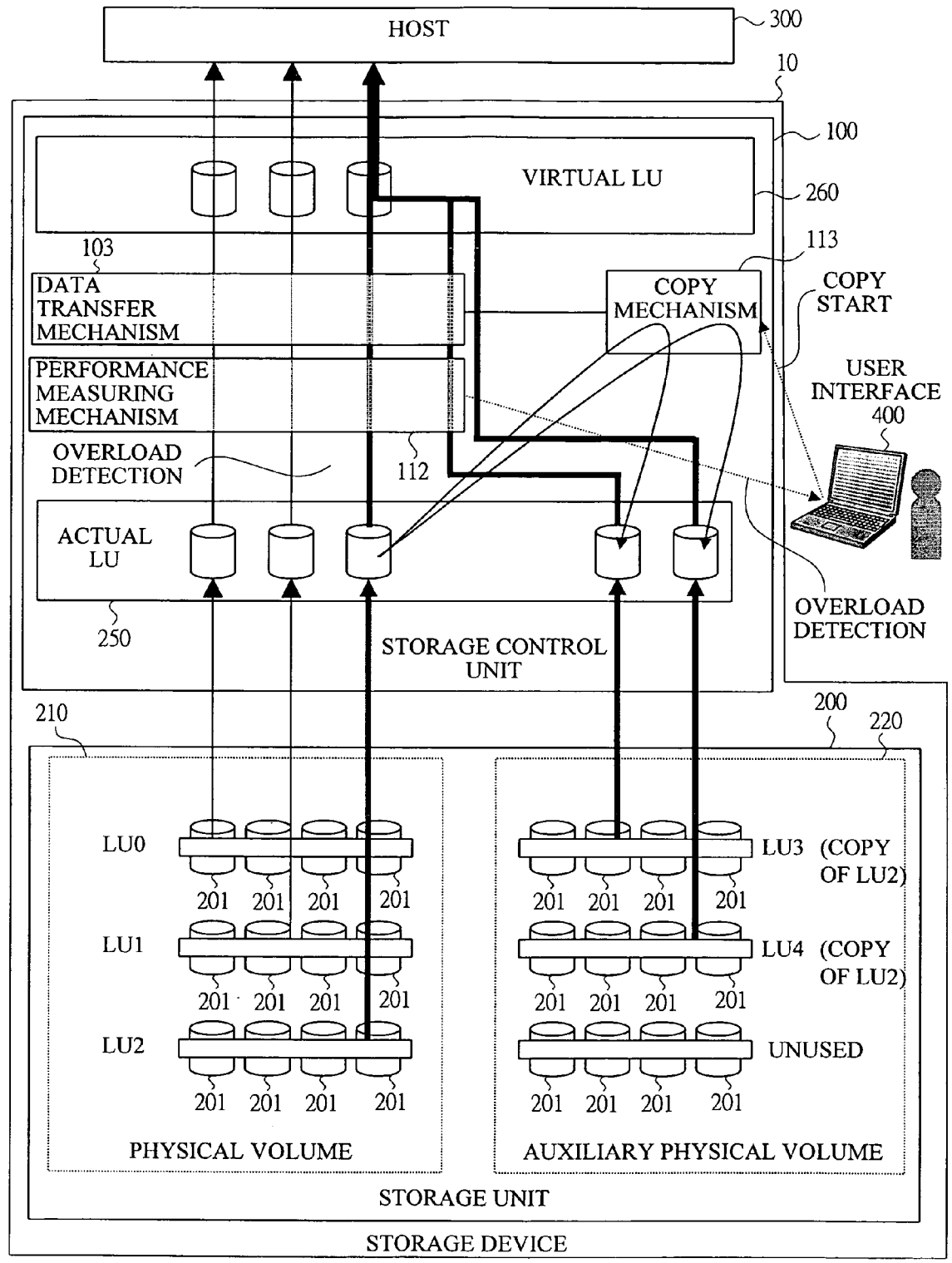
FIG. 16 is an explanatory view for describing a load distribution processing of a storage device according to a third embodiment of the present invention.

A description will be made of an operation of a load distribution processing of the storage device according to the third embodiment of the present invention with reference to FIG. 16. FIG. 16 is an explanatory view for describing a load distribution processing of the storage device according to the third embodiment of the present invention.

In FIG. 16, a user terminal 400 is connected to the storage control unit 100, and has a structure in which a overload of the LU can be detected based on the information measured by the performance measuring mechanism 112. Further, it is possible to execute the copy processing from the LU of the physical volume 210 to the LU of the auxiliary physical volume 220, which is described in the first and second embodiments, by applying an instruction of starting the copy to a copy mechanism 113 based on the detection results.

In the present embodiment, it is possible to execute the copy instruction from the user terminal on a user side, in addition to the automatic copy of the LU by the storage device 10.

As mentioned above, the invention made by the inventors has been specifically described based on the embodiments. However, needless to say, the present invention is not limited to the above embodiments and can be variously altered and modified without departing from the gist thereof.

An effect obtained by the representative ones of the inventions disclosed by the present application will be briefly described as follows.

According to the present invention, it is possible to flexibly execute the dynamic load distribution and performance expansion at the minimum cost, with respect to the unexpected peak performance demand that changes in time sequence such as the web server and the contents delivery.

What is claimed is:

1. A storage device comprising:
   a storage control unit; and
   a storage unit,
   wherein said storage control unit includes:
   a host interface (I/F) control section executing communication with an upper apparatus;
   a disk I/F control section executing communication with said storage unit;
   a data transfer mechanism executing a data transfer processing between said host and said storage unit;
   a cache memory temporarily storing data to be transferred between said host and said storage unit;
   a performance measuring mechanism; and
   a copy mechanism,
   said storage unit includes:
   a physical volume and an auxiliary physical volume that are physical memory regions provided by a plurality of physical disk drives for storing data; and
   a plurality of logical volumes each being a logical memory region to be set in each of said physical volume and said auxiliary physical volume,
   wherein a load condition of said each logical volume is measured by said performance measuring mechanism based on a data amount and a command processing amount to be transferred by said data transfer mechanism,
   a content of said each logical volume set in said physical volume is copied to said each logical volume set in said auxiliary physical volume by said copy mechanism based on a measurement result of said performance measuring mechanism, and
   said each logical volume set in said auxiliary physical volume copied by said copy mechanism and said each logical volume set in said physical volume serving as a copy source are provided as one virtual logical volume to said upper apparatus, thereby distributing a load from said upper apparatus.

2. The storage device according to claim 1,
   wherein if no copying region is provided in said auxiliary physical volume at a time of copying said each logical volume by said copy mechanism, one of the logical volumes having a smaller load than to be copied out of said each logical volume in said auxiliary physical volume is cancelled and a vacant region of said one logical volume is formed in said auxiliary physical volume.

3. The storage device according to claim 1,
   wherein if no copying region is provided in said auxiliary physical volume at a time of copying said each logical volume by said copy mechanism, one of the logical volumes having a lower order of priority than the remaining logical volumes to be copied out of said each logical volume in said auxiliary physical volume is cancelled and a vacant region of said one logical volume is formed in said auxiliary physical volume.

4. A storage device comprising:
   a storage control unit; and
   a storage unit, wherein said storage control unit includes:
a host interface (I/F) control section executing communication with an upper apparatus;
a disk I/F control section executing communication with said storage unit;
a data transfer mechanism executing a data transfer processing between said host and said storage unit;
a cache memory temporarily storing data to be transferred between said host and said storage unit;
a performance measuring mechanism; and
a copy mechanism,
said storage unit includes:
a physical volume and an auxiliary physical volume that are physical memory regions provided by a plurality of physical disk drives for storing data; and
a plurality of logical volumes each being a logical memory region to be set in each of said physical volume and said auxiliary physical volume,
wherein a load condition of said each logical volume set in said physical volume is measured by said performance measuring mechanism based on a data amount and a command processing amount to be transferred by said data transfer mechanism,
data accessed from said upper apparatus out of contents of said each logical volume set in said physical volume is copied to said each logical volume set in said auxiliary physical volume by said copy mechanism based on a measurement result of said performance measuring mechanism, and copied information is controlled as difference control information, and
said each logical volume set in said physical volume and said each logical volume set in said auxiliary physical volume copied by said copy mechanism are provided as one virtual logical volume to said upper apparatus, thereby distributing a load from said upper apparatus based on said difference control information.

5. The storage device according to claim 4,
wherein a content of said each logical volume set in said physical volume to be copied is copied to said each logical volume set in said auxiliary physical volume in the background by said copy mechanism, and said difference control information is updated so as to be in a copied state.

\* \* \* \* \*